(12) United States Patent
Bao

(10) Patent No.: US 12,175,733 B2
(45) Date of Patent: Dec. 24, 2024

(54) DEPTH CAMERA ASSEMBLY, DEVICE FOR COLLECTING DEPTH IMAGE AND MULTI-SENSOR FUSION SYSTEM

(71) Applicant: BEIJING XIAOMI MOBILE SOFTWARE CO., LTD., Beijing (CN)

(72) Inventor: Dinghua Bao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 300 days.

(21) Appl. No.: 17/854,600

(22) Filed: Jun. 30, 2022

(65) Prior Publication Data

US 2023/0306728 A1 Sep. 28, 2023

(30) Foreign Application Priority Data

Mar. 24, 2022 (CN) .......................... 202210302614.X

(51) Int. Cl.
*G06V 10/80* (2022.01)
*G04R 20/02* (2013.01)
*G06V 20/56* (2022.01)
*H04N 23/45* (2023.01)

(52) U.S. Cl.
CPC ............. *G06V 10/80* (2022.01); *G04R 20/02* (2013.01); *G06V 20/56* (2022.01); *H04N 23/45* (2023.01)

(58) Field of Classification Search
CPC ........ G06V 10/80; G06V 20/56; H04N 23/45; G04R 20/02
See application file for complete search history.

(56) References Cited

U.S. PATENT DOCUMENTS

| 9,270,974 | B2 | 2/2016 | Zhang et al. | |
|---|---|---|---|---|
| 10,250,868 | B1 | 4/2019 | Arnold et al. | |
| 2020/0177870 | A1 | 6/2020 | Tadi et al. | |
| 2021/0354719 | A1* | 11/2021 | Wang | ..................... G01D 21/00 |
| 2022/0333950 | A1* | 10/2022 | Akbarzadeh | ....... G01C 21/3804 |
| 2023/0049796 | A1* | 2/2023 | Yamamoto | ............. G01C 21/26 |

FOREIGN PATENT DOCUMENTS

| CN | 110312056 | A | * | 10/2019 | ............. H04N 23/45 |
|---|---|---|---|---|---|
| CN | 110460824 | A | | 11/2019 | |
| CN | 213092100 | U | | 4/2021 | |
| CN | 110312056 | B | | 9/2021 | |

OTHER PUBLICATIONS

The Partial European Search Report issued in EP Application No. 22182152.3, dated Dec. 16, 2022,(13p).

* cited by examiner

*Primary Examiner* — James T Boylan
(74) *Attorney, Agent, or Firm* — Arch & Lake LLP

(57) ABSTRACT

A depth camera assembly is provided. The depth camera assembly includes: a depth camera, configured to generate a trigger signal, in which the trigger signal is configured to instruct the depth camera to perform a first exposure operation to obtain first image information; a red-green-blue (RGB) camera, communicatively connected to the depth camera to receive the trigger signal, in which the trigger signal is configured to instruct the RGB camera to perform a second exposure operation to obtain second image information; and a processor, communicatively connected respectively to the depth camera and the RGB camera to receive the trigger signal, the first image information and the second image information, and configured to record a time stamp of the first image information and the second image information based on local time of receiving the trigger signal.

15 Claims, 3 Drawing Sheets

DEPTH CAMERA ASSEMBLY, DEVICE FOR COLLECTING DEPTH IMAGE AND MULTI-SENSOR FUSION SYSTEM

CROSS-REFERENCE TO RELATED APPLICATION

This application is based upon and claims priority to Chinese Patent Application No. 202210302614.X, filed on Mar. 24, 2022, the entire content of which is incorporated herein by reference for all purposes.

TECHNICAL FIELD

The disclosure relates to the field of terminal technologies, and more particularly, to a depth camera assembly, a device for collecting a depth image and a multi-sensor fusion system.

BACKGROUND

For some RGB-D (Red-Green-Blue-Depth) cameras currently on the market, they can obtain image information and depth information respectively.

SUMMARY

According to a first aspect of the disclosure, a depth camera assembly is provided, including: a depth camera, configured to generate a trigger signal, in which the trigger signal is configured to instruct the depth camera to perform a first exposure operation to obtain first image information; a red-green-blue (RGB) camera, communicatively connected to the depth camera to receive the trigger signal, in which the trigger signal is configured to instruct the RGB camera to perform a second exposure operation to obtain second image information; and a processor, communicatively connected to the depth camera and the RGB camera respectively to receive the trigger signal, the first image information and the second image information, and configured to record a time stamp of the first image information and the second image information based on local time of receiving the trigger signal.

According to a second aspect of the disclosure, a device for collecting a depth image is provided, including: the depth camera assembly as described according to the first aspect, and a global position system (GPS) module, communicatively connected to the depth camera assembly, and configured to update local time of the processor of the depth camera assembly.

According to a third aspect of the disclosure, a multi-sensor fusion system is provided, including: a master sensor including the depth camera assembly according to the first aspect; and one or more slave sensors, in which each slave sensor includes a second trigger signal input end for receiving the trigger signal output by the depth camera assembly, and configured to perform a third exposure operation based on the trigger signal.

According to a fourth aspect of the disclosure, an autonomous mobile device is provided, including: the multi-sensor fusion system according to the third aspect.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of embodiments do not represent all implementations consistent with the disclosure. Instead, they are merely examples of apparatuses and methods consistent with aspects related to the disclosure as recited in the appended claims.

Terms used in the disclosure are merely for describing specific examples and are not intended to limit the disclosure. The singular forms "one", "the", and "this" used in the disclosure and the appended claims are also intended to include a multiple form, unless other meanings are clearly represented in the context. It should also be understood that the term "and/or" used in the disclosure refers to any or all possible combinations including one or more associated listed items.

Although terms "first", "second", "third", and the like are used in the disclosure to describe various information, the information is not limited to the terms. These terms are merely used to differentiate information of a same type. For example, without departing from the scope of the disclosure, first information is also referred to as second information, and similarly the second information is also referred to as the first information. Depending on the context, for example, the term "if" used herein can be explained as "when" or "while", or "in response to . . . , it is determined that".

For an imaging quality of RGB-D cameras, it needs to record image information and depth information at the same time, to process to obtain high-quality data information. If image information is not combined with depth information at the same time, it can result in image distortion and poor user experience. The disclosure provides a depth camera assembly, a device for collecting a depth image and a multi-sensor fusion system, to solve deficiencies in the related art.

Figure 1:
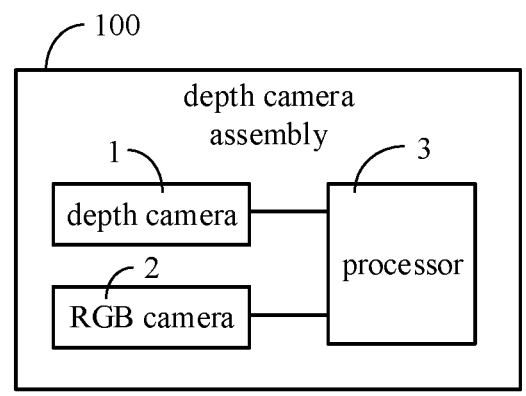
FIG. 1 is a block diagram of a depth camera assembly according to embodiments.
Figure 2:
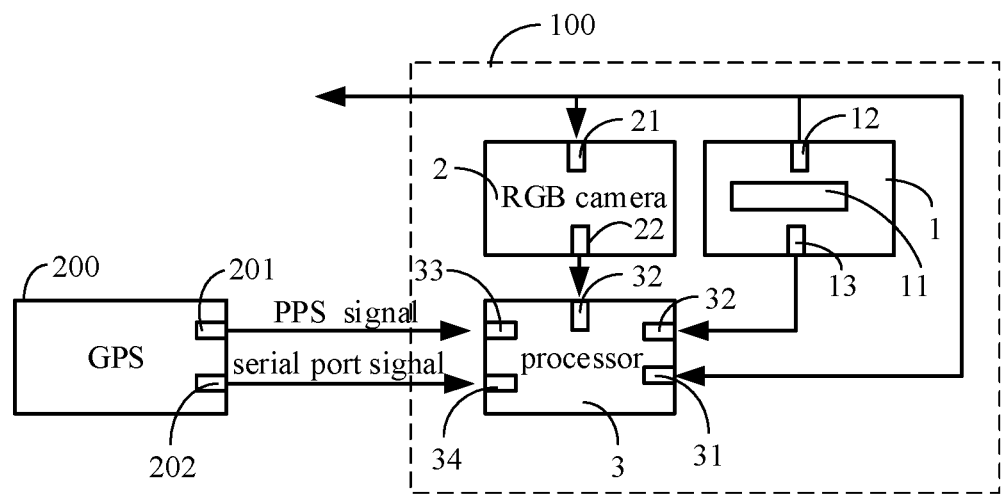
FIG. 2 is a block diagram of a device for collecting a depth image according to embodiments.

FIG. 1 is a block diagram of a depth camera assembly 100 according to embodiments and FIG. 2 is a block diagram of a device for collecting a depth image according to embodiments. As illustrated in FIG. 1 and FIG. 2, the depth camera assembly 100 includes a depth camera 1, an RGB camera 2 and a processor 3. The processor 3 is communicatively connected to the depth camera 1 and the RGB camera 2 respectively to obtain first image information detected by the depth camera 1 and second image information detected by the RGB camera 2. The depth camera 1 and the processor 3 can be connected by a data wire connection or a wireless connection, and similarly, the RGB camera 2 and the processor 3 can be connected by a data wire connection or a wireless connection, which is not limited in the disclosure.

In detail, the depth camera 1 is configured to generate a trigger signal. The trigger signal is configured to instruct the depth camera 1 to perform a first exposure operation, thereby obtaining first image information. The depth camera 1 can also be communicatively connected to the RGB camera 2 and the RGB camera 2 can receive the trigger signal sent by the depth camera 1. The trigger signal can also be configured to instruct the RGB camera 2 to perform a second exposure operation, thereby obtaining second image information. The processor 3 can receive the trigger signal and the first image information through the communication connection with the depth camera 1, receive the second image information through the communication connection with the RGB camera 2, and record the local time of receiving the trigger signal as the time when the depth camera 1 and the RGB camera 2 are triggered, so that the time stamp of the first image information and the second image information can be recorded based on the local time.

Based on the technical solutions of the disclosure, when the depth camera 1 is triggered by the trigger signal, the RGB camera 2 can also be triggered based on the received trigger signal, so that the depth camera 1 and the RGB camera 2 can be triggered at the same time, which is beneficial to obtain the first image information and the second image information at the same time to improve the fusion accuracy between the first image information and the second image information. The processor 3 can record the timestamp of the first image information and the second image information based on the same local time, which is also beneficial to the fusion accuracy between the first image information and the second image information at the same time. The trigger signal can include a high-frequency pulse signal, such as a high-frequency pulse signal of 20 Hz or 30 Hz.

In some embodiments, the depth camera 1 can include a trigger signal generating module 11, a trigger signal output end 12 and a first image information output end 13. The trigger signal generating module 11 is connected to the trigger signal output end 12 to output the trigger signal generated by the trigger signal generating module 11 through the trigger signal output end 12. The RGB camera 2 includes a first trigger signal input end 21 and a second image information output end 22. The first trigger signal input end 21 can be communicatively connected to the trigger signal output end 12, so that the trigger signal generated by the trigger signal generating module 11 can be obtained through the first trigger signal input end 21. The processor 3 can include a first input end 31 and a second input end 32. The first input end 31 can be communicatively connected to the trigger signal output end 12 to receive the trigger signal output by the trigger signal output end 12 through the first input end 31. The second input end 32 can be connected to the first image information output end 13 and the second image information output end 22 respectively, to receive the first image information and the second image information through the second input end 32. As shown in FIG. 2, the processor 3 can include a plurality of second input ends 32, in which one second input end 32 is configured to receive the first image information and another second input end 32 is configured to receive the second image information. In other embodiments, the processor 3 can also include a single second input end 32, and the first image information and the second image information are received through the single second input end 32, which is not limited in the disclosure. The high-frequency pulse signal is connected to the first input end 31 of the processor 3. When a trigger edge (a rising edge or a falling edge) of the high-frequency pulse signal is received, a second interrupt signal is generated, the local time corresponding to the second interrupt signal is read, and the local time corresponding to the second interrupt signal is recorded as the timestamp of the first image information and the second image information based on the local time.

Further, in order to improve the fusion accuracy between the depth camera assembly 100 and other sensor data, as shown in FIG. 2, the processor 3 can further include a third input end 33 and a serial port input end 34. The device for collecting a depth image can also include a GPS module 200. The GPS module can be communicatively connected to the depth camera assembly 100 to update the local time of the processor 3 through the GPS module. In detail, the GPS module 200 can include a PPS (Pulse Per Second) signal output end 201 and a serial port output end 202. The PPS signal output end 201 can be connected to the third input end 33 of the processor 3, and the serial port output end 202 can be connected to the serial port input end 34 of the processor 3. The processor 3 can receive the PPS pulse signal sent by the PPS signal output end 201 through the third input end 33, and receive the serial port signal output by the serial port output end 202 through the serial port input end 34.

The processor 3 can record first local time when a target edge of the PPS pulse signal is received, analyze universal time coordinated (UTC) time when the target edge of the PPS pulse signal is received based on the received serial port signal, record second local time when the UTC time is obtained at the same time, determine current UTC time corresponding to the second local time based on the first local time, the second local time and the UTC time, and update local time of the processor 3 based on the current UTC time. In detail, the current UTC time is defined as the new second local time, so that the local time of the processor 3 can be aligned with the UTC time. It can be understood that the GPS module 200 can obtain the standard time signal from GPS satellites. Furthermore, the local time of the processor can be updated through the interaction between the GPS module 200 and the processor 3 based on the standard time signal, to reduce or eliminate the deviation between the local time and the standard time signal, which is beneficial to realize the time alignment between the depth camera assembly 100 and other sensors through the standard time signal and is convenient for the fusion between the data of the depth camera assembly 100 and other sensors. Compared with the scheme of timing by the local clock of the processor 3, the offset between the local time of processor 3 and the UTC time is reduced or eliminated. The processor 3 can generate the first interrupt signal when the target edge of the PPS pulse signal is received through the third input end 33, and the processor 3 can obtain the accurate local time when the target edge occurs by recording the time of the first interrupt signal, that is, obtain the first local time, which can effectively ensure the reliability of the first local time.

The serial port signal can include GPRMC data or GPGGA data output by the GPS module 200. The GPS module 200 can output a piece of GPRMC data or GPGGA data after each output of the PPS pulse signal, and the processor 3 can obtain the UTC time of the target edge by parsing the GPRMC data or GPGGA data. The target edge can include a rising edge or a falling edge of the PPS pulse signal. When the target edge is the rising edge, the processor 3 can obtain the UTC time corresponding to the rising edge by parsing the GPRMC data or GPGGA data. When the target edge is the falling edge, the processor 3 can obtain the UTC time corresponding to the falling edge by parsing the GPRMC data or GPGGA data. The GPGGA data is a GPS data output format statement, which usually includes 17 fields: statement header, world time, latitude, latitude hemisphere, longitude, longitude hemisphere, positioning quality indication, number of satellites used, horizontal precision factor, ellipsoid height, altitude unit, geoid height anomaly difference, height unit, differential GPS data period, differential reference base station label, checksum tag and end tag, separated by commas.

In the above embodiments, the processor 3 can further include a calculating module. It is assumed that the first local time is T1, the UTC time is T2, the second local time is T3, and the current UTC time corresponding to the second local time, which needs to be determined by the processor 3, is T4. In some embodiments, the difference between the first local time T1 and the second local time T3, recorded based on the local time of the processor 3 before the update, can be defined as the difference between the UTC time T2 and the current UTC time T4 corresponding to the second local time T3. Therefore, the calculating module can calculate the current UTC time T4 based on the sum of the difference between the second local time T3 and the first local time T1 and the UTC time T2, that is, T4=T2+(T3-T1). In other embodiments, since there can be a certain error between the local time of the processor 3 before the update and the UTC time, the difference between the first local time T1 and the second local time T3 can be calibrated, and then can be summed with the UTC time T3 to calculate the current UTC time T4. The calibration manner can be that the difference between the first local time T1 and the second local time T3 is multiplied by the weight or can be that the difference between the first local time T1 and the second local time T3 minus or plus a calibration value, in which the calibration value can be obtained based on experiments, which is not limited in the disclosure.

Further, the GPS module 200 continuously sends the PPS pulse signal to the processor 3 at a certain frequency. In fact, in some cases, when the error of the local time of the processor 3 is within an allowable range, the local time may not be updated, thereby reducing the resource waste of the processor 3. Therefore, the processor 3 can also consider that the error of the local time currently used by the processor 3 exceeds the allowable range when the difference between the second local time T3 and the current UTC time T4 is greater than a preset threshold. Therefore, the local time is updated based on the UTC time T4.

Figure 3:
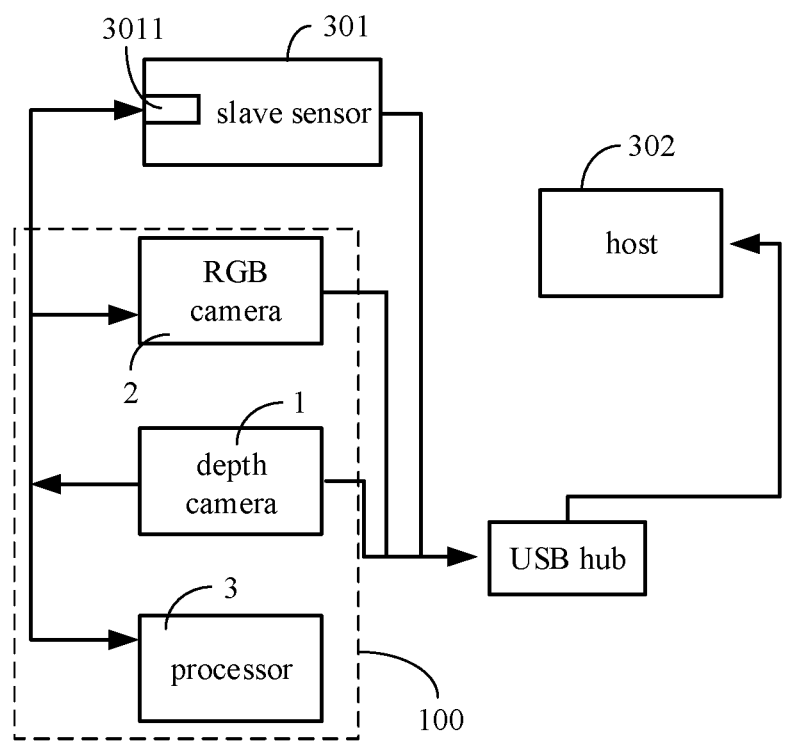
FIG. 3 is a block diagram of a multi-sensor fusion system according to embodiments.

Based on the technical solutions of the disclosure, as shown in FIG. 3, the disclosure further provides a multi-sensor fusion system. The multi-sensor fusion system includes a master sensor and a slave sensor 301. The master sensor can include the depth camera assembly 100 in any one of the above-mentioned embodiments. The slave sensor 301 can include a second trigger signal input end 3011. The second trigger signal input end 3011 can be connected to the trigger signal output end 12 of the depth camera assembly 100, so that the trigger signal output by the depth camera 1 can be received by the second trigger signal input end 3011, and the slave sensor 301 can perform the third exposure operation based on the received trigger signal.

Each slave sensor 301 can include one or more cameras, and at least one camera can be provided with the second trigger signal input end 3011. The trigger signal output end 12 of the depth camera 1 can be connected to the second trigger signal input end of the at least one camera, to trigger the corresponding camera to perform the third exposure operation. For example, each slave sensor 301 can include a depth camera 1 and an RGB camera or can also include other telephoto camera or wide-angle camera, which is not limited in the disclosure. In some embodiments of the disclosure, the fusion system includes a single slave sensor 301 as an example for illustration. In other embodiments, the fusion system can also include multiple slave sensors 300, and at least one of the multiple slave sensors 300 can be triggered by the depth camera 1 of the master sensor.

Based on this, in the fusion system, other cameras included in the master sensor can be triggered simultaneously through the depth camera 1 of the master sensor, and the slave sensor 301 can also be triggered through the depth camera 1 of the master sensor at the same time, to realize the synchronous triggering between the master sensor and the slave sensor 301, which is beneficial to obtain the target image at the same time, reduce the fusion error between subsequent image information, and improve the fusion accuracy.

Figure 4:
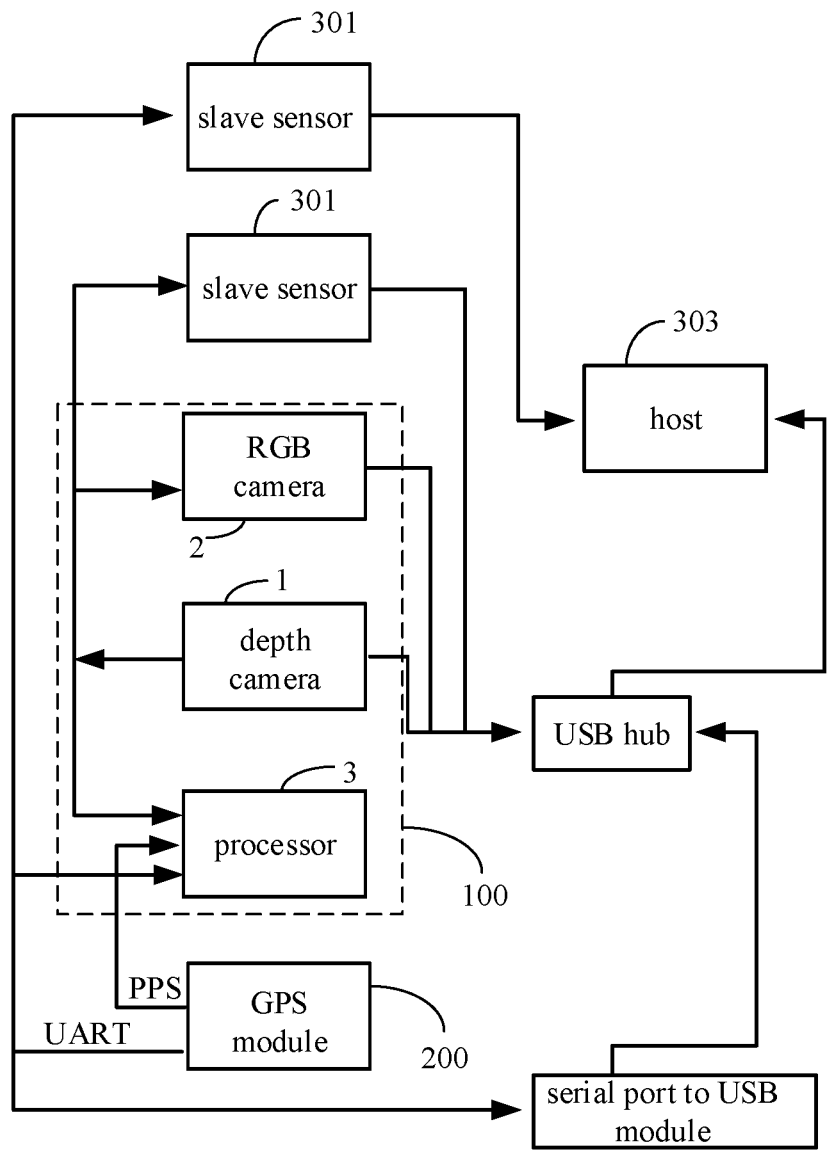
FIG. 4 is a block diagram of another multi-sensor fusion system according to embodiments.

As shown in FIG. 4, the fusion system can also include a GPS module 200 and a host 302. The GPS module 200 can be configured to update the local time of the master sensor and the slave sensor 301, so that the master sensor and the slave sensor can record the time stamp of obtained image information based on the updated local time. The host 302 can be communicatively connected to the master sensor and the slave sensor 301 respectively. For example, in some embodiments provided by the disclosure, the communication connection can be made through a USB data line. In other embodiments provided by the disclosure, the communication connection between the host 302 and the master sensor and the slave sensor 301 can also be realized by means of wireless communication. The host 302 is configured to receive the image information obtained by the master sensor and the slave sensor, and process and fuse the image information based on the time stamp. Based on this, the time is updated by the GPS module 200, which can align the local time of the master sensor and the slave sensor with the world time, and reduce the fusion error caused by the time error of the master sensor and the slave sensor itself. The specific implementation of the GPS module 200 updating the local time of the master sensor and the slave sensor can refer to the foregoing embodiments, which will not be repeated herein.

Still as shown in FIG. 4, the GPS module 200 can also be communicatively connected to the host 302. The positioning function of the GPS module 200 may be used to locate absolute positioning information of the autonomous mobile device located by the GPS module 200. The absolute positioning information is relative to the earth coordinate system. The host is configured to obtain the absolute positioning information and obtain relative positioning information of the autonomous mobile device based on the image information. The relative positioning information can be based on any reference point in the traveling process of the autonomous mobile device. In detail, the Slam fusion algorithm can be used to obtain the relative positioning information.

The absolute positioning information and the relative positioning information can be both configured to plan a movement path of the autonomous mobile device. For example, in some places or areas with weak GPS signals, the relative positioning information can be configured to plan the movement path. In some places or areas with good GPS signals, the movement path can be planned through the absolute positioning information, thereby improving the movement accuracy. At the same time, the absolute positioning information can also be used to correct the error of the relative positioning information. For example, the absolute positioning information of the reference point and the absolute positioning information of the current position point can be compared to obtain the distance between the reference point and the current position point to correct the relative positioning information. The positioning information obtained by the GPS module 200 can be output through the serial port output end 202, and then sent to the host 302 through the serial port to USB module of the fusion system.

It should be noted that the embodiments shown in FIG. 3 and FIG. 4 are only used for exemplary illustration. In other embodiments, the multi-sensor fusion system can also include other sensors, such as a microphone module or an IMU (inertial measurement unit) sensor. There is no limit to the disclosure. As shown in FIG. 3, the multi-sensor fusion system can include a single slave sensor, or as shown in FIG. 4, the multi-sensor fusion system can include two slave sensors, or in other embodiments, the multi-sensor fusion system can also include three or more slave sensors, which is not limited in the disclosure.

Based on the technical solutions of the disclosure, an autonomous mobile device is also provided. The autonomous mobile device can include the multi-sensor fusion system described in any of the above embodiments, and the autonomous mobile device can include an autonomous vehicle, an unmanned aerial vehicle, or the like, which is not limited in the disclosure.

The solutions provided by embodiments of the disclosure can include the following beneficial effects. It can be known from the above embodiments that when the depth camera generates the trigger signal to trigger the depth camera, the trigger information can also be transmitted to trigger the RGB camera through the trigger signal, to realize the simultaneous triggering of the depth camera and the RGB camera, which is beneficial to obtain the first image information and the second image information at the same time to improve the fusion accuracy between the first image information and the second image information. The processor can record the timestamp of the first image information and the second image information based on the same local time, which is also beneficial to the fusion accuracy between the first image information and the second image information at the same time.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A depth camera assembly, comprising:
a depth camera, configured to generate a trigger signal, wherein the trigger signal is configured to instruct the depth camera to perform a first exposure operation to obtain first image information;
a red-green-blue (RGB) camera, communicatively connected to the depth camera to receive the trigger signal, wherein the trigger signal is configured to instruct the RGB camera to perform a second exposure operation to obtain second image information; and
a processor, wherein the processor comprises:
a third input end, connected to a pulse per second (PPS) signal output end of a global position system (GPS) module to receive a PPS pulse signal output by the PPS signal output end; and a serial port input end, connected to a serial port output end of the GPS module to receive a serial port signal output by the serial port output end,
and wherein the processor is communicatively connected respectively to the depth camera and the RGB camera to receive the trigger signal, the first image information and the second image information, and configured to record a time stamp of the first image information and the second image information based on local time of receiving the trigger signal, and the processor is configured to record first local time in response to receiving a target edge of the PPS pulse signal, analyze universal time coordinated (UTC) time in response to receiving the target edge based on the serial port signal, and record second local time in response to obtaining the UTC time, to determine current UTC time corresponding to the second local time based on the first local time, the second local time and the UTC time, and update local time of the processor based on the current UTC time.

2. The depth camera assembly as claimed in claim 1, wherein:
the depth camera comprises a trigger signal generating module, a trigger signal output end and a first image information output end, the trigger signal generating module is connected to the trigger signal output end, and the trigger signal generating module is configured to generate the trigger signal;
the RGB camera comprises a first trigger signal input end and a second image information output end, the first trigger signal input end is communicatively connected to the trigger signal output end to obtain the trigger signal through the trigger signal output end; and
the processor comprises a first input end and a second input end, the first input end is communicatively connected to the trigger signal output end to obtain the trigger signal through the trigger signal output end, and the second input end is respectively connected to the first image information output end and the second image information output end to obtain the first image information and the second image information.

3. The depth camera assembly as claimed in claim 1, wherein the processor further comprises:
a calculating module, configured to calculate the current UTC time based on a sum of: a difference between the second local time and the first local time, and the UTC time.

4. The depth camera assembly as claimed in claim 3, wherein the processor is configured to update the local time in response to a difference between the second local time and the current UTC time being greater than a preset threshold.

5. A device for collecting a depth image, comprising:
a depth camera, configured to generate a trigger signal, wherein the trigger signal is configured to instruct the depth camera to perform a first exposure operation to obtain first image information;
a red-green-blue (RGB) camera, communicatively connected to the depth camera to receive the trigger signal, wherein the trigger signal is configured to instruct the RGB camera to perform a second exposure operation to obtain second image information;

a processor, wherein the processor comprises a third input end and a serial port input end,
and wherein the processor is communicatively connected respectively to the depth camera and the RGB camera to receive the trigger signal, the first image information and the second image information, and configured to record a time stamp of the first image information and the second image information based on local time of receiving the trigger signal; and
a global position system (GPS) module, configured to update local time of the processor, wherein the GPS module comprises a pulse per second (PPS) signal output end and a serial port output end,
wherein the third input end is connected to the PPS signal output end to receive a PPS pulse signal output by the PPS signal output end,
the serial port input end is connected to the serial port output end to receive a serial port signal output by the serial port output end, and
the processor is configured to record first local time in response to receiving a target edge of the PPS pulse signal, analyze universal time coordinated (UTC) time in response to receiving the target edge based on the serial port signal, and record second local time in response to obtaining the UTC time, to determine current UTC time corresponding to the second local time based on the first local time, the second local time and the UTC time, and update local time of the processor based on the current UTC time.

6. The device as claimed in claim 5, wherein:
the depth camera comprises a trigger signal generating module, a trigger signal output end and a first image information output end, the trigger signal generating module is connected to the trigger signal output end, and the trigger signal generating module is configured to generate the trigger signal;
the RGB camera comprises a first trigger signal input end and a second image information output end, the first trigger signal input end is communicatively connected to the trigger signal output end to obtain the trigger signal through the trigger signal output end; and
the processor comprises a first input end and a second input end, the first input end is communicatively connected to the trigger signal output end to obtain the trigger signal through the trigger signal output end, and the second input end is respectively connected to the first image information output end and the second image information output end to obtain the first image information and the second image information.

7. The device as claimed in claim 5, wherein the processor further comprises:
a calculating module, configured to calculate the current UTC time based on a sum of: a difference between the second local time and the first local time, and the UTC time.

8. The device as claimed in claim 7, wherein the processor is configured to update the local time in response to a difference between the second local time and the current UTC time being greater than a preset threshold.

9. A multi-sensor fusion system, comprising:
a master sensor comprising:
a depth camera, configured to generate a trigger signal, wherein the trigger signal is configured to instruct the depth camera to perform a first exposure operation to obtain first image information;
a red-green-blue (RGB) camera, communicatively connected to the depth camera to receive the trigger signal, wherein the trigger signal is configured to instruct the RGB camera to perform a second exposure operation to obtain second image information; and
a processor, wherein the processor further comprises a third input end and a serial port input end,
and wherein the processor is communicatively connected respectively to the depth camera and the RGB camera to receive the trigger signal, the first image information and the second image information, and configured to record a time stamp of the first image information and the second image information based on local time of receiving the trigger signal;
one or more slave sensors, wherein each slave sensor comprises a second trigger signal input end for receiving the trigger signal output by the depth camera, and configured to perform a third exposure operation based on the trigger signal; and
a global position system (GPS) module, configured to update local time of the master sensor and the one or more slave sensors, and the master sensor and the one or more slave sensors are configured to record a timestamp of obtained image information based on the updated local time, wherein the GPS module comprises a pulse per second (PPS) signal output end and a serial port output end,
wherein the third input end is connected to the PPS signal output end to receive a PPS pulse signal output by the PPS signal output end,
the serial port input end is connected to the serial port output end to receive a serial port signal output by the serial port output end, and
the processor is configured to record first local time in response to receiving a target edge of the PPS pulse signal, analyze universal time coordinated (UTC) time in response to receiving the target edge based on the serial port signal, and record second local time in response to obtaining the UTC time, to determine current UTC time corresponding to the second local time based on the first local time, the second local time and the UTC time, and update local time of the processor based on the current UTC time.

10. The system as claimed in claim 9, further comprising:
a host, communicatively connected to the master sensor and the one or more slave sensors respectively, and configured to receive image information obtained by the master sensor and the one or more slave sensors, and process and fuse the image information based on the timestamp.

11. The system as claimed in claim 10, wherein:
the GPS module is communicatively connected to the host, and further configured to locate absolute positioning information of an autonomous mobile device to which the system belongs; and
the host is further configured to obtain the absolute positioning information and obtain relative positioning information of the autonomous mobile device based on the image information, and both the absolute positioning information and the relative positioning information is configured to plan a movement path of the autonomous mobile device.

12. The system as claimed in claim 9, wherein:
the depth camera comprises a trigger signal generating module, a trigger signal output end and a first image information output end, the trigger signal generating module is connected to the trigger signal output end, and the trigger signal generating module is configured to generate the trigger signal;

the RGB camera comprises a first trigger signal input end and a second image information output end, the first trigger signal input end is communicatively connected to the trigger signal output end to obtain the trigger signal through the trigger signal output end; and the processor comprises a first input end and a second input end, the first input end is communicatively connected to the trigger signal output end to obtain the trigger signal through the trigger signal output end, and the second input end is respectively connected to the first image information output end and the second image information output end to obtain the first image information and the second image information.

13. The system as claimed in claim 9, wherein the processor further comprises:

a calculating module, configured to calculate the current UTC time based on a sum of: a difference between the second local time and the first local time, and the UTC time.

14. The system as claimed in claim 13, wherein the processor is configured to update the local time in response to a difference between the second local time and the current UTC time being greater than a preset threshold.

15. An autonomous mobile device, comprising:

the multi-sensor fusion system as claimed in claim 9.

* * * * *